United States Patent
Ueda et al.

(10) Patent No.: US 11,226,781 B2
(45) Date of Patent: Jan. 18, 2022

(54) EDITING DEVICE, PRINTING SYSTEM AND EDITING METHOD

(71) Applicant: BROTHER KOGYO KABUSHIKI KAISHA, Nagoya (JP)

(72) Inventors: Hideaki Ueda, Nagoya (JP); Mina Shinagawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/206,139

(22) Filed: Mar. 19, 2021

(65) Prior Publication Data

US 2021/0303242 A1    Sep. 30, 2021

(30) Foreign Application Priority Data

Mar. 31, 2020    (JP) .............................. JP2020-063891

(51) Int. Cl.
*G06F 3/12*    (2006.01)

(52) U.S. Cl.
CPC .......... *G06F 3/1243* (2013.01); *G06F 3/1208* (2013.01)

(58) Field of Classification Search
CPC .............................. G06F 3/1243; G06F 3/1208
See application file for complete search history.

(56) References Cited

U.S. PATENT DOCUMENTS

| | | | |
|---|---|---|---|
| 2009/0122023 A1* | 5/2009 | Kikuoka | .............. G06F 3/0488 345/173 |
| 2018/0281471 A1 | 10/2018 | Ito et al. | |

FOREIGN PATENT DOCUMENTS

| | | |
|---|---|---|
| JP | 2016-7776 A | 1/2016 |
| JP | 2016-71238 A | 5/2016 |
| JP | 2018-171870 A | 11/2018 |
| JP | 2019-53586 A | 4/2019 |

* cited by examiner

*Primary Examiner* — King Y Poon
*Assistant Examiner* — Michael Burleson
(74) *Attorney, Agent, or Firm* — Kenealy Vaidya LLP

(57) ABSTRACT

An editing device includes a controller configured to edit a layout of characters to be printed on a printing medium including a light-transmitting area and a non-light-transmitting area. The controller execute displaying a medium image and an input area image overlapped on the medium image, the input area image including a light-transmitting input portion overlapping a first portion of the medium image and corresponding to the light-transmitting area, determining whether arrangement of the characters in the light-transmitting input portion is enabled or disabled, and restricting the arrangement of the characters in the light-transmitting input portion. In the restricting, the arrangement in the light-transmitting input portion is allowed when it is determined that the arrangement in the light-transmitting input portion is enabled, and the arrangement in the light-transmitting input portion is prohibited when it is determined that the arrangement in the light-transmitting input portion is disabled.

6 Claims, 6 Drawing Sheets

EDITING DEVICE, PRINTING SYSTEM AND EDITING METHOD

CROSS REFERENCE TO RELATED APPLICATIONS

This application is based on Japanese Patent Applications No. 2020-063891 filed on Mar. 31, 2020, the entire contents of which are incorporated herein by reference.

TECHNICAL FIELD

The present invention relates to an editing device, a printing system and an editing method for editing characters to be printed on a printing medium.

BACKGROUND ART

JP-A-2019-53586 discloses a printing system including a label printer and an operation terminal. The label printer and the operation terminal are connected so as to be able to communicate with each other. In the printing system, an operator can edit content of a text to be printed on a print label in the label printer by using an editing application executed on the operation terminal. In the editing application, a text editing area frame is superimposed on an image showing the print label. The operator inputs characters into the text editing area frame by operating the operation terminal. Accordingly, the characters are arranged in a superimposed manner at a specific position of the image showing the print label. The label printer performs printing at the specific position on the print label based on print information or the like generated by the operation terminal by executing the editing application, and prints the characters.

As in Japanese Patent No. 6379724, a printing medium including an area having translucency (hereinafter referred to as a "light-transmitting area") and an area having no translucency (hereinafter referred to as a "non-light-transmitting area") may be used.

When printing is performed in the light-transmitting area, a color of an adherend can be seen through while ink is attached to the adherend. Therefore, when a color of characters to be printed is similar to the color of the adherend, visibility of the characters may be lowered. Therefore, when a layout of the characters on the printing medium is edited in an editing device, the characters are preferably not to be arranged in the light-transmitting area as much as possible. On the other hand, for example, when the printing medium is attached to a cable or the like by being wound therearound, printing a mark for alignment in the light-transmitting area is also required. For this reason, preferably, the editing device can arrange the characters in the light-transmitting area as desired by the operator.

An object of the present invention is to provide an editing device, a printing system and an editing method capable of laying out characters or the like such that printing in a light-transmitting area of a printing medium can be performed as necessary while preventing printing in the light-transmitting area.

SUMMARY OF INVENTION

According to a first aspect of the invention, an editing device includes a controller that is configured to edit a layout of characters to be printed on a printing medium including a light-transmitting area having translucency and a non-light-transmitting area having no translucency. In the editing device, the controller is configured to execute displaying, on a display unit, a medium image corresponding to the printing medium and an input area image overlapped on the medium image and indicating an input area in which the characters are arranged, the input area image including a light-transmitting input portion overlapping a first portion of the medium image and corresponding to the light-transmitting area, determining whether arrangement of the characters in the light-transmitting input portion is enabled or disabled; and restricting the arrangement of the characters in the light-transmitting input portion. In the restricting, the arrangement of the characters in at least a part of the light-transmitting input portion is allowed when it is determined, in the determining, that the arrangement of the characters in the light-transmitting input portion is enabled, and the arrangement of the characters in the light-transmitting input portion of the input area is prohibited when it is determined, in the determining, that the arrangement of the characters in the light-transmitting input portion is disabled.

According to a second aspect of the invention, a printing system includes the editing device of the first aspect and a printing device that is configured to print the characters on the printing medium based on the layout edited by the editing device.

According to a third aspect of the invention, an editing method for editing a layout of characters to be printed on a printing medium including a light-transmitting area having translucency and a non-light-transmitting area having no translucency includes displaying, on a display unit, a medium image corresponding to the printing medium and an input area image overlapped on the medium image and indicating an input area in which the characters are arranged, the input area image including a light-transmitting input portion overlapping a first portion of the medium image and corresponding to the light-transmitting area, determining whether arrangement of the characters in the light-transmitting input portion is enabled or disabled, and restricting the arrangement of the characters in the light-transmitting input portion. In the restricting, the arrangement of the characters in at least a part of the light-transmitting input portion is allowed when it is determined, in the determining, that the arrangement of the characters in the light-transmitting input portion is enabled, and the arrangement of the characters in the light-transmitting input portion of the input area is prohibited when it is determined, in the determining, that the arrangement of the characters in the light-transmitting input portion is disabled.

By the first to third aspects, a user of the editing device may avoid printing of the character in the light-transmitting area on the printing medium by disabling the arrangement of the character in the light-transmitting input portion of the input area with the editing device. On the other hand, the user may allow printing of the character in at least a part of the light transmitting area of the input area when necessary by enabling the arrangement of the character in the light-transmitting input portion of the input area with the editing device.

DESCRIPTION OF EMBODIMENTS

Figure 1:
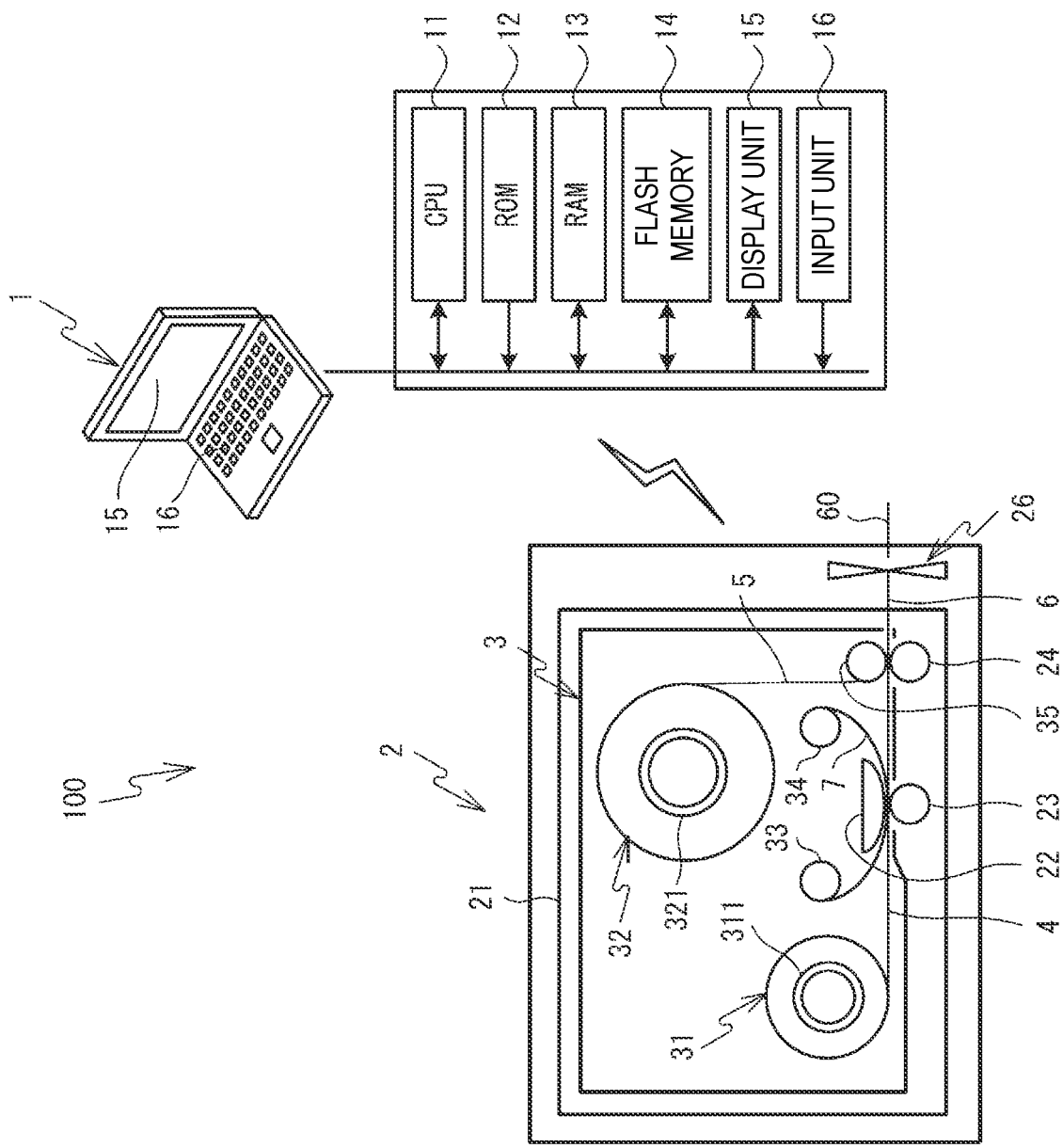
FIG. 1 is an explanatory view showing a schematic configuration of a printing system 100.

A printing system 100 according to an embodiment of the present invention will be described with reference to drawings. The drawings are used to illustrate technical features that may be adopted by the present invention. That is, a configuration and control of a device described in the drawings are not intended to be limited thereto, and are merely explanatory examples.

Overview of Printing System 100

An overview of the printing system 100 will be described with reference to FIG. 1. The printing system 100 includes an editing device 1 and a printing device 2. The editing device 1 is, for example, a personal computer, and may communicate with the printing device 2 wirelessly or by wire. The editing device 1 edits the position and size of one or two or more characters, numerals, codes, symbols, graphics and the like to be printed on a tape 6 (hereinafter referred to as "characters") to generate print data, and transmits the generated print data to the printing device 2. The printing device 2 prints the characters on a film 4 constituting the tape 6 based on the print data transmitted from the editing device 1. The printing device 2 produces a printing tape 60 by cutting the tape 6 in which the characters are printed on the film 4. The produced printing tape 60 is attached to a cable 10 or the like (see FIG. 3).

An electrical configuration of the editing device 1 will be described with reference to FIG. 1. The editing device 1 includes a CPU 11, a ROM 12, a RAM 13, a flash memory 14, a display unit 15 and an input unit 16 that are connected to each other. The CPU 11 functions as a processor and controls the editing device 1. The ROM 12 stores a program for the CPU 11 to execute main processing (see FIGS. 10 and 12) described later, information required by the CPU 11 when the program is executed, and the like. The RAM 13 temporarily stores various data and the like to be referred to by the CPU 11. The flash memory 14 stores print data and the like necessary for printing. The display unit 15 is an LCD. The input unit 16 is a keyboard, a mouse or the like, and outputs a signal corresponding to an operation to the input unit 16 to the CPU 11.

A mechanical configuration of the printing device 2 will be described with reference to FIG. 1. The printing device 2 includes a mounting portion 21. A tape cassette 3 is detachably attached to the mounting portion 21. A first tape roll 31, a second tape roll 32, a ribbon roll 33, a ribbon roll-up spool 34 and a pressing roller 35 are provided in the tape cassette 3.

The first tape roll 31 is formed by winding the film 4 around a first spool 311. The second tape roll 32 is formed by winding a double-sided adhesive tape 5 around a second spool 321. The ribbon roll 33 is formed by winding an ink ribbon 7 around a ribbon spool (not shown). The ink ribbon 7 bridges between the ribbon roll 33 and the ribbon roll-up spool 34. The ribbon roll-up spool 34 rolls up the ink ribbon 7 used for printing. The pressing roller 35 is exposed to outside from the tape cassette 3.

The mounting portion 21 is provided with a thermal head 22, a platen roller 23 and a pressing roller 24. The thermal head 22 performs printing by transferring ink 71 (see FIG. 2) from the ink ribbon 7 to the film 4. In the present embodiment, a color of the ink 71 is black. The platen roller 23 holds the film 4 with the thermal head 22 and pulls out and conveys the film 4 from the first tape roll 31 by rotating.

The pressing roller 24 holds the film 4 and the double-sided adhesive tape 5 with the pressing roller 35. The double-sided adhesive tape 5 is pressure-bonded to a printing surface 41 (see FIG. 2) of the film 4 to form the tape 6. The pressing rollers 24, 35 convey the tape 6 while pulling out the double-sided adhesive tape 5 from the second tape roll 32 by rotating. A cutter 26 is provided downstream of the pressing roller 24 in a conveyance direction of the tape 6. The cutter 26 cuts the tape 6.

A controller (not shown) of the printing device 2 performs a printing operation as follows. As the platen roller 23 rotates, the film 4 is pulled out from the first tape roll 31. The ink 71 is transferred from the ink ribbon 7 to the pulled out film 4 by the thermal head 22, and the characters are printed. The double-sided adhesive tape 5 is pulled out from the second tape roll 32. The printed film 4 is pressure-bonded to the pulled out double-sided adhesive tape 5 by the pressing rollers 24, 35 to form the tape 6. The tape 6 is cut by the cutter 26 to form the printing tape 60.

Details of Tape 6

Figure 2:
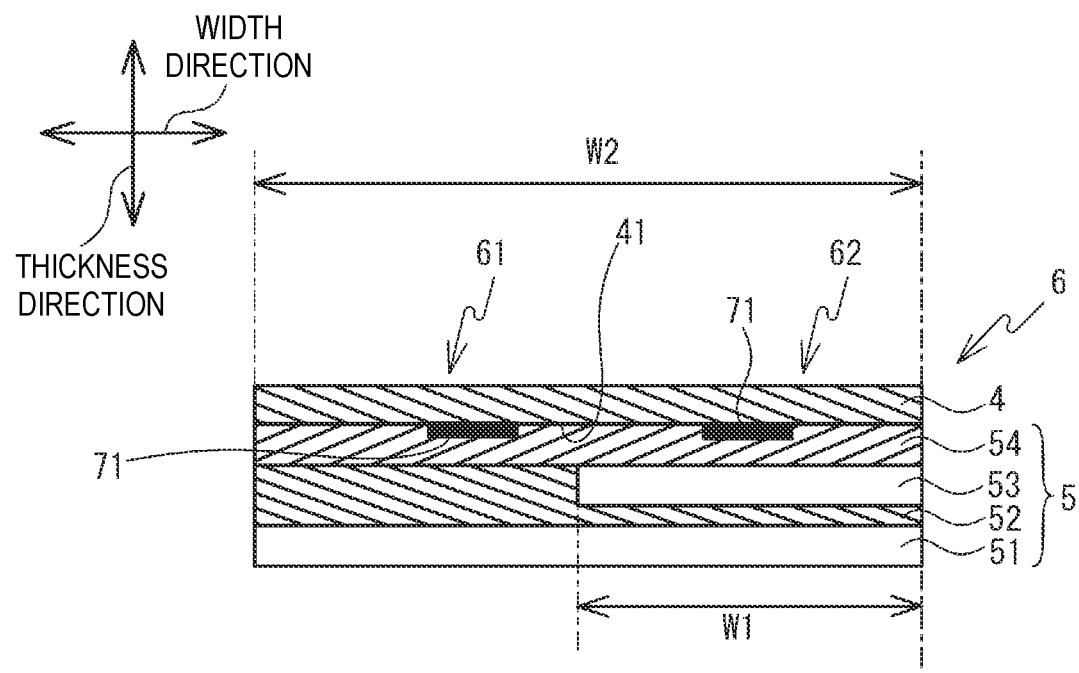
FIG. 2 is a schematic view of a tape 6 viewed from an elongated direction of the tape.

A detailed structure of the tape 6 will be described with reference to FIG. 2. Hereinafter, an elongated direction of the tape 6 is simply referred to as the "elongated direction", a width direction of the tape 6 is simply referred to as the "width direction", and a thickness direction of the tape 6 is simply referred to as the "thickness direction". In FIG. 2, a left-right direction, an upper-lower direction and a direction orthogonal to a paper surface are respectively the width direction, the thickness direction and the elongated direction.

The tape 6 has the structure in which the film 4 and the double-sided adhesive tape 5 are laminated on each other. The film 4 is a transparent film having an elongated shape. In the present embodiment, "transparent" is a property of a medium in which an object on a back side of the medium or printed content is visible from a front side of the medium, and includes colorless transparent, colored transparent, colorless translucent and colored translucent. That is, "transparent" refers to a property of a medium having translucency. Hereinafter, a property of a medium having no translucency is referred to as "opaque". In FIG. 2, a transparent medium is hatched with inclined lines and an opaque medium is plain.

The double-sided adhesive tape 5 has an elongated shape. The double-sided adhesive tape 5 is formed by laminating a release paper 51, an adhesive layer 52, a mount 53 and an adhesive layer 54 in this order in the thickness direction. The release paper 51 has an elongated shape and has a shape substantially the same as the film 4. The adhesive layer 52 is transparent and is provided on an entire surface of one surface of the release paper 51. The mount 53 is opaque and is provided on a part of a surface of the adhesive layer 52 opposite to the release paper 51. In the present embodiment, a color of the mount 53 is white. A width W1 of the mount 53 is shorter than a width W2 of the film 4. The adhesive layer 54 is transparent and is provided on a portion of the adhesive layer 52 opposite to the release paper 51 other than the mount 53 and on a surface of the mount 53 opposite to the release paper 51. The printing surface 41 of the film 4 is bonded to a surface of the adhesive layer 54 opposite to the adhesive layer 52 or the mount 53.

Since the mount 53 is opaque, an area of the mount 53 of the tape 6 (hereinafter referred to as an "opaque area 62") is opaque even when the release paper 51 is peeled off from the double-sided adhesive tape 5. Since the adhesive layers 52, 54 and the film 4 are transparent in a portion of the tape 6 where the mount 53 does not exist (hereinafter referred to as a "transparent area 61"), the portion is transparent when the release paper 51 is peeled off from the double-sided adhesive tape 5. The transparent area 61 and the opaque area 62 are arranged in the width direction and extend in the elongated direction.

Method of Using Printing Tape 60

Figure 3:
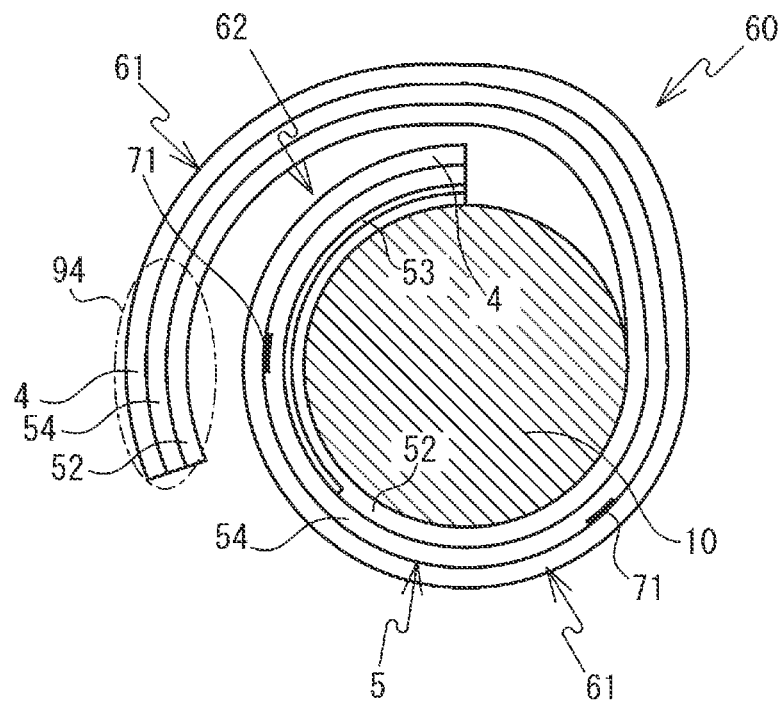
FIG. 3 is a view showing a printing tape 60 in a process of being wound around a cable 10.

An example of a method of using the printing tape 60 in which the tape 6 is cut will be described with reference to FIGS. 3 to 5. FIG. 3 is a view of the printing tape 60 in the middle of being attached to the cable 10 as viewed from an axial direction of the cable 10. First, a user peels off the release paper 51 (see FIG. 2) from the printing tape 60. The user attaches the printing tape 60 around the cable 10 with the exposed adhesive layer 52 inside. The elongated direction of the printing tape 60 coincides with the axial direction of the cable 10. In this case, if a length of the printing tape 60 in the width direction is larger than a length of an outer circumference of the cable 10, the printing tape 60 is wound such that the transparent area 61 covers the opaque area 62 from the outside.

Figure 4:
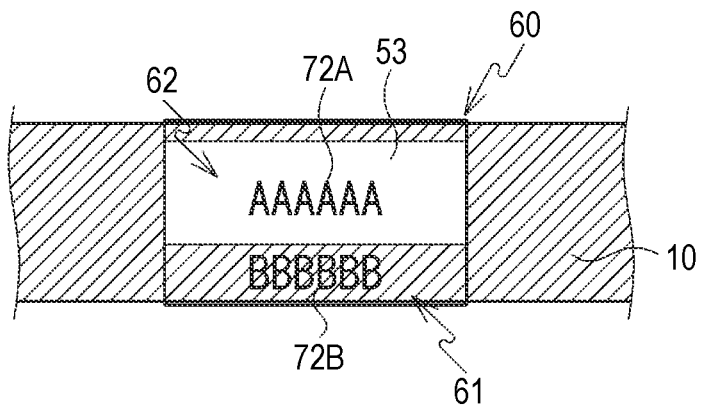
FIG. 4 is a view showing the printing tape 60 wound around the cable 10.
Figure 5:
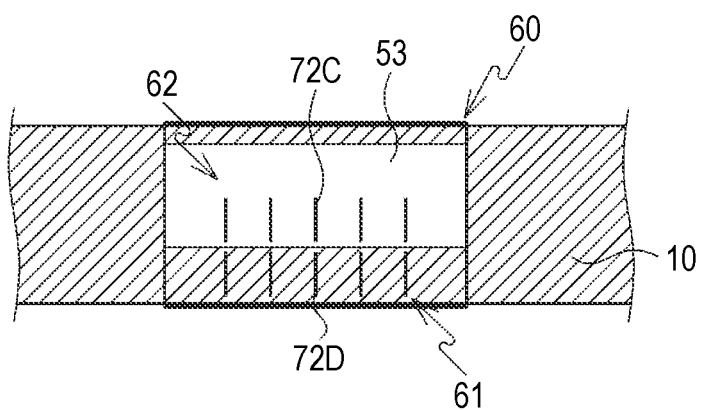
FIG. 5 is a view showing the printing tape 60 wound around the cable 10.

FIG. 4 is a view of the printing tape 60 attached to the cable 10 as viewed from a direction orthogonal to the axial direction of the cable 10. When the user views the printing tape 60 attached to the cable 10, the user visually recognizes characters 72A "AAAAAA" printed on the printing tape 60 with the mount 53 as a background in the opaque area 62. On the other hand, in the transparent area 61, characters 72B "BBBBBB" printed on the printing tape 60 are visible with the cable 10 as a background. This is because the transparent area 61 is transparent and the cable 10 is seen through the transparent area 61.

In the above, since the background of the characters 72A is the mount 53, the characters 72A and the background are clearly distinguished, and visibility of the characters 72A is maintained. On the other hand, since the background of the characters 72B is the cable 10, it may be difficult to distinguish the characters 72B from the background depending on a relationship between the color of the ink 71 for printing the characters 72B and a color of the cable 10. Therefore, when a position of the characters to be printed on the tape 6 is edited using the editing device 1, it is preferable that the characters are not arranged in the transparent area 61 as much as possible. On the other hand, for example, as shown in FIG. 5, there is also a request to print a symbol 72D for aligning a position with a symbol 72C printed in the opaque area 62 in the transparent area 61 such that alignment can be performed when the printing tape 60 is wound around the cable 10. Therefore, preferably, the editing device 1 can arrange the characters in the transparent area 61 as desired by the user.

Overview of Editing Processing by Editing Device 1

Figure 6:
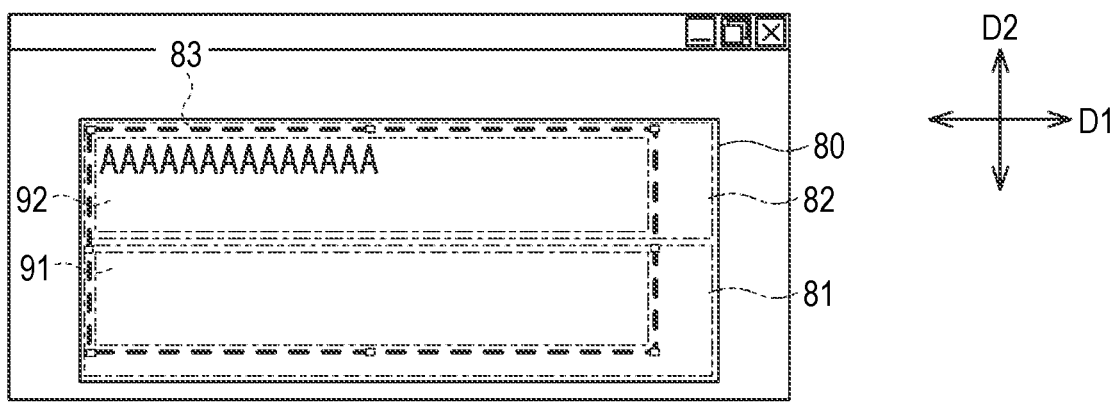
FIG. 6 is a view showing a screen displayed on a display unit 15 when editing processing is executed.

FIG. 6 shows an example of a screen displayed on the display unit 15 (see FIG. 1) when processing of editing the position and size of the characters to be printed on the tape 6 (hereinafter referred to as "editing processing") is executed in the editing device 1. A medium image 80 and an input area image 83 are displayed on the display unit 15.

The medium image 80 is an image showing the tape 6 which is a printing medium during printing by the printing device 2. The medium image 80 is a rectangle that is long in the left-right direction. The left-right direction of the medium image 80 coincides with the elongated direction of the tape 6. The upper-lower direction of the medium image 80 coincides with the width direction of the tape 6. A left end of the medium image 80 corresponds to a leading end of the tape 6. The input area image 83 is arranged so as to be superimposed on the medium image 80. The characters to be printed by the printing device 2 are arranged in the input area image 83 in the left-right direction. Hereinafter, a direction in which the characters are arranged is referred to as an "arrangement direction D1".

The editing device 1 generates the print data for printing the characters after the input area image 83 is arranged in the medium image 80 and the characters are arranged in the input area image 83. Hereinafter, arrangement of the input area image 83 and arrangement of the characters in the input area image 83 are referred to as "a layout of the characters is edited". The printing device 2 performs the printing on the tape 6 based on the print data generated by the editing device 1. The printing device 2 cuts the printed tape 6 along the width direction to create the printing tape 60.

A portion of the medium image 80 corresponding to the transparent area 61 of the tape 6 is referred to as a "transparent portion 81". A portion of the medium image 80 corresponding to the opaque area 62 of the tape 6 is referred to as an "opaque portion 82". The transparent portion 81 and the opaque portion 82 are arranged along the width direction of the tape 6 indicated by the medium image 80. In FIG. 6, the input area image 83 is arranged over the transparent area 61 and the opaque area 62 of the medium image 80. A portion of the input area image 83 overlapping the transparent portion 81 of the medium image 80 is referred to as a "transparent input portion 91". A portion of the input area image 83 overlapping the opaque portion 82 of the medium image 80 is referred to as an "opaque input portion 92". The transparent input portion 91 and the opaque input portion 92 are arranged along the width direction of the tape 6 indicated by the medium image 80, similarly to the transparent portion 81 and the opaque portion 82. Hereinafter, among directions of the medium image 80, a direction corresponding to the width direction of the corresponding tape 6, that is, an upper-lower direction in FIG. 6 is referred to as a "width direction D2".

Figure 7:
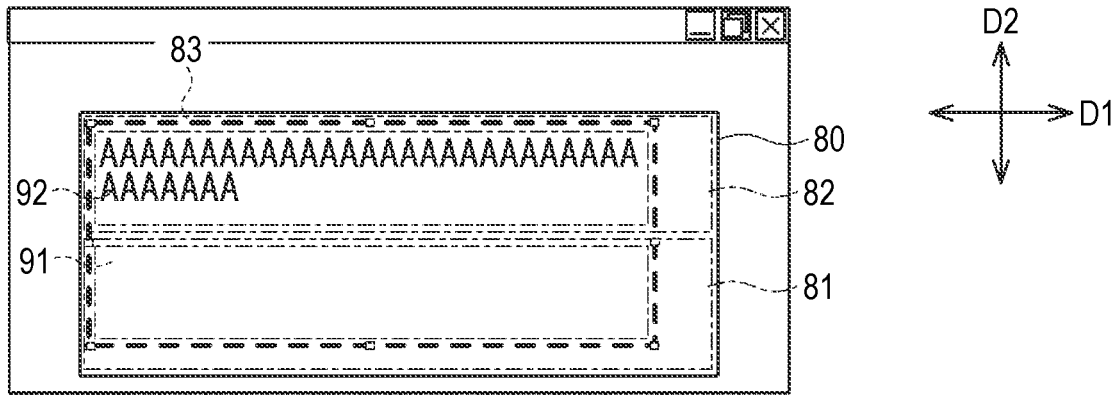
FIG. 7 is a view showing a transparent input portion 91 and an opaque input portion 92 of an input area image 83.

When an input operation of the characters is received via the input unit 16, the editing device 1 arranges the input characters in the arrangement direction D1 and arranges the characters in the input area image 83. When the characters arranged in the arrangement direction D1 do not fit in the input area image 83 in response to an increase in the number of characters input via the input unit 16, the editing device 1 inserts a line break between the characters such that the characters fit in the input area image 83 in the arrangement direction D1, as shown in FIG. 7. As a result, a plurality of rows in which the characters are arranged in the arrangement direction D1 is formed. The plurality of rows is arranged in the width direction D2 orthogonal to the arrangement direction D1.

Figure 8:
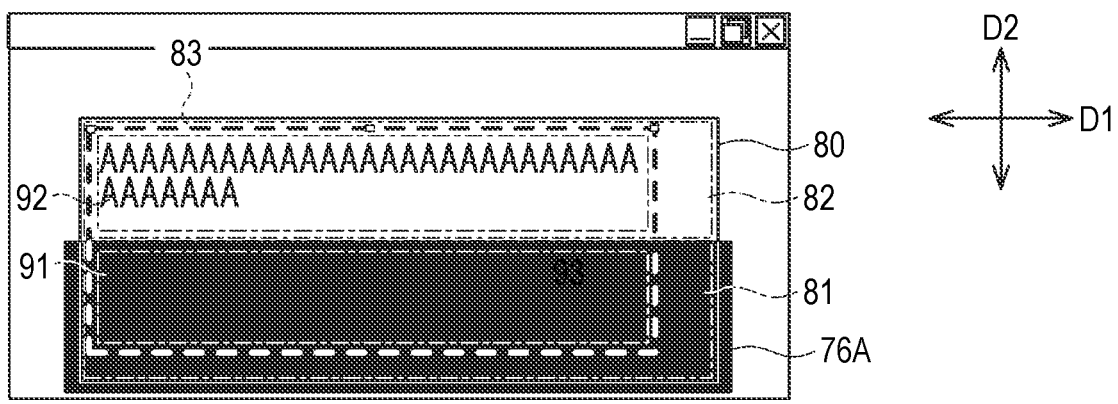
FIG. 8 is a view showing a screen when first restriction processing is executed.

When the characters are arranged in the input area image 83 as described above, the editing device 1 restricts the arrangement of the characters in the transparent input portion 91 by one of the following two types of processing. As shown in FIG. 8, the first is processing of covering the entire transparent input portion 91 with a mask image 76A and masking the entire transparent input portion 91. The mask image 76A has a rectangular shape, and inside thereof is painted black. The editing device 1 covers the entire transparent input portion 91 with the mask image 76A, and prohibits the arrangement of the characters in the transparent input portion 91 by hiding the characters arranged in the transparent input portion 91. Hereinafter, the processing of prohibiting the arrangement of the characters in the entire transparent input portion 91 by the above method is referred to as "first restriction processing".

Figure 9:
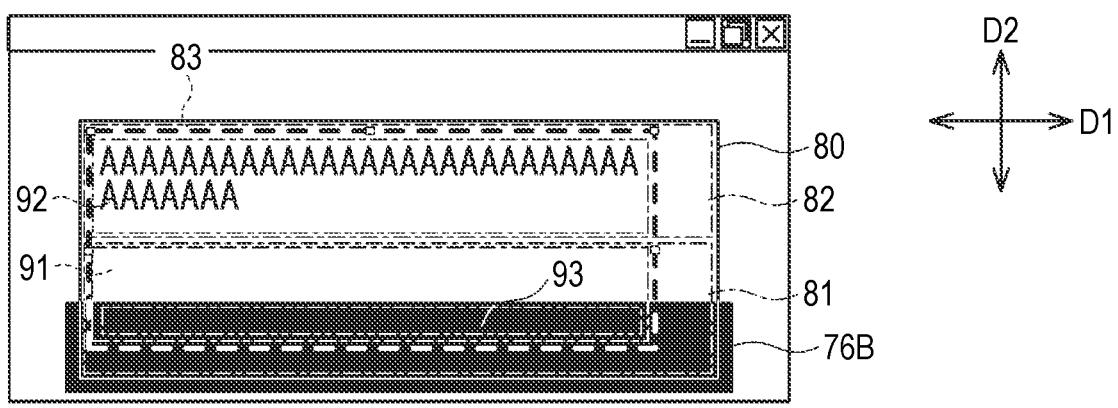
FIG. 9 is a view showing a screen when second restriction processing is executed.

As shown in FIG. 9, the second is processing of covering a portion of the transparent input portion 91 apart from the opaque input portion 92 in the width direction D2 (hereinafter referred to as a "prohibition portion 93") with a mask image 76B and masking the portion of the transparent input portion 91 (prohibition portion 93). The editing device 1 covers the prohibition portion 93 with the mask image 76B, and prohibits the arrangement of the characters in the prohibition portion 93 by hiding the characters arranged in the prohibition portion 93. Since the characters arranged in a portion of the transparent input portion 91 other than the prohibition portion 93 is visible, the arrangement of the characters in this portion is allowed. Hereinafter, the processing of prohibiting the arrangement of the characters in the prohibition portion 93 by the above method and allowing the arrangement of the characters in the portion of the transparent input portion 91 other than the prohibition portion 93 is referred to as "second restriction processing".

The reason for prohibiting the arrangement of the characters in the prohibition portion 93 in the second restriction processing is that, as shown in FIG. 3, a prohibition area 94 corresponding to the prohibition portion 93 of the transparent area 61 of the printing tape 60 is likely to cover the characters printed in the opaque area 62 from the outside when wound around the cable 10. Here, when the characters are printed in the prohibition area 94 of the printing tape 60, the characters printed in the prohibition area 94 overlaps the characters printed in the opaque area 62, and the visibility may be lowered. Therefore, the editing device 1 prohibits the arrangement of the characters in the prohibition portion 93 in the second restriction processing, thereby reducing the possibility that the characters overlap each other to lower the visibility.

Setting Processing

Figure 10:
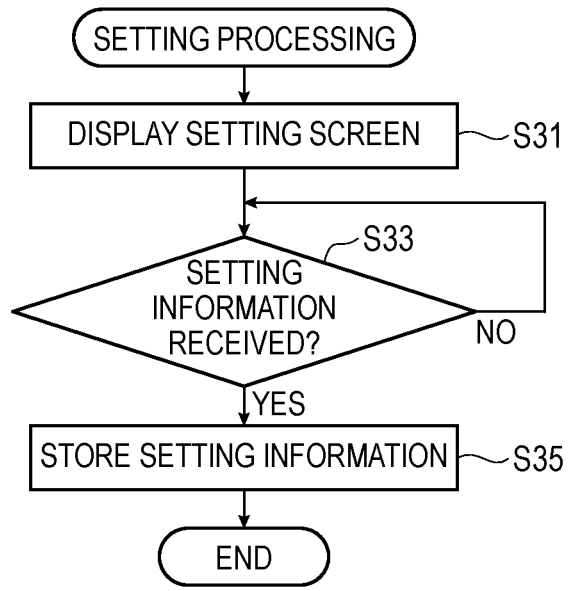
FIG. 10 is a flowchart of setting processing.

Setting processing will be described with reference to FIG. 10. When a setting instruction for setting whether to enable or disable the arrangement of the characters in the transparent input portion 91 is input via the input unit 16, the CPU 11 starts the setting processing by reading and executing the program stored in the flash memory 14.

The CPU 11 displays on the display unit 15 a setting screen (see FIG. 11) capable of setting whether to enable or disable the arrangement of the characters in the transparent input portion 91 (S31). The CPU 11 waits for setting information indicating whether to enable or disable the arrangement of the characters in the transparent input portion 91 (S33). When the setting information is not received (S33: NO), the processing returns to S33 and the CPU 11 continuously waits for the setting information.

Figure 11:
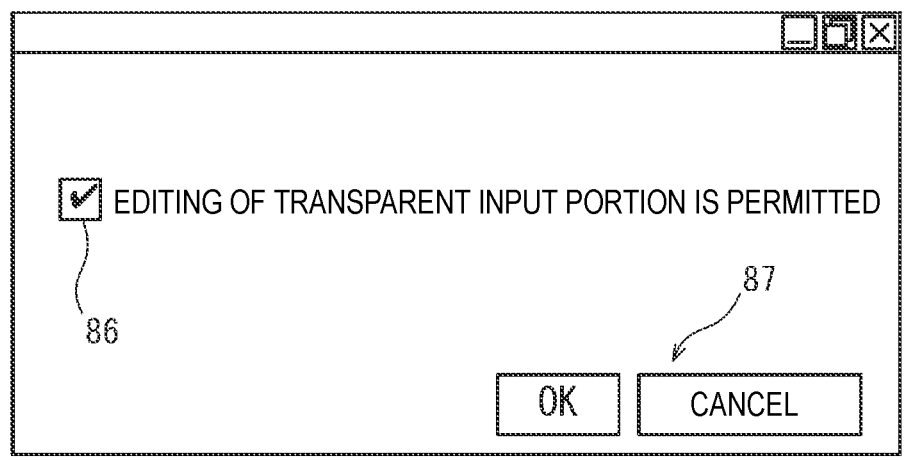
FIG. 11 is a view showing a setting screen.

As shown in FIG. 11, a check box 86 and a selection button 87 are displayed on the setting screen. In order to enable the arrangement of the characters in the transparent input portion 91, a check mark is input to the check box 86. For example, when the arrangement of the characters in the transparent input portion 91 is enabled, the user performs an input operation of selecting the selection button 87 of "OK" with the check mark input to the check box 86. In this case, the CPU 11 receives the setting information indicating that the arrangement of the characters in the transparent input portion 91 is enabled via the setting screen (S33: YES, see FIG. 10). The CPU 11 stores the received setting information in the flash memory 14 (S35). Then, the CPU 11 ends the setting processing. On the other hand, In order to disable the arrangement of the characters in the transparent input portion 91 is disabled, the user performs an input operation of selecting the selection button 87 of "OK" with the check mark removed in the check box 86. In this case, the CPU 11 receives the setting information indicating that the arrangement of the characters in the transparent input portion 91 is disabled via the setting screen (S33: YES, see FIG. 10). The CPU 11 stores the received setting information in the flash memory 14 (S35). Then, the CPU 11 ends the setting processing.

Main Processing

Main processing will be described with reference to FIG. 12. When an instruction for starting the editing processing is input via the input unit 16, the main processing is started by the CPU 11 reading and executing the program stored in the flash memory 14.

The CPU 11 displays the medium image 80 on the display unit 15 (S11). The CPU 11 further displays the input area image 83 superimposed on the medium image 80 (S11). Based on the setting information stored in the flash memory 14, the CPU 11 determines whether to enable or disable the arrangement of the characters in the transparent input portion 91 (S13).

When the CPU 11 determines that the arrangement of the characters in the transparent input portion 91 is disabled (S13: YES), the processing proceeds to S15. The CPU 11 executes the first restriction processing in order to prohibit the arrangement of the characters in the entire transparent input portion 91 of the input area image 83 (S15). In this case, as shown in FIG. 8, the entire transparent input portion 91 is covered with the mask image 76A by mask processing, and the arrangement of the characters in the transparent input portion 91 is prohibited. Then, the CPU 11 advances the processing to S19.

Figure 12:
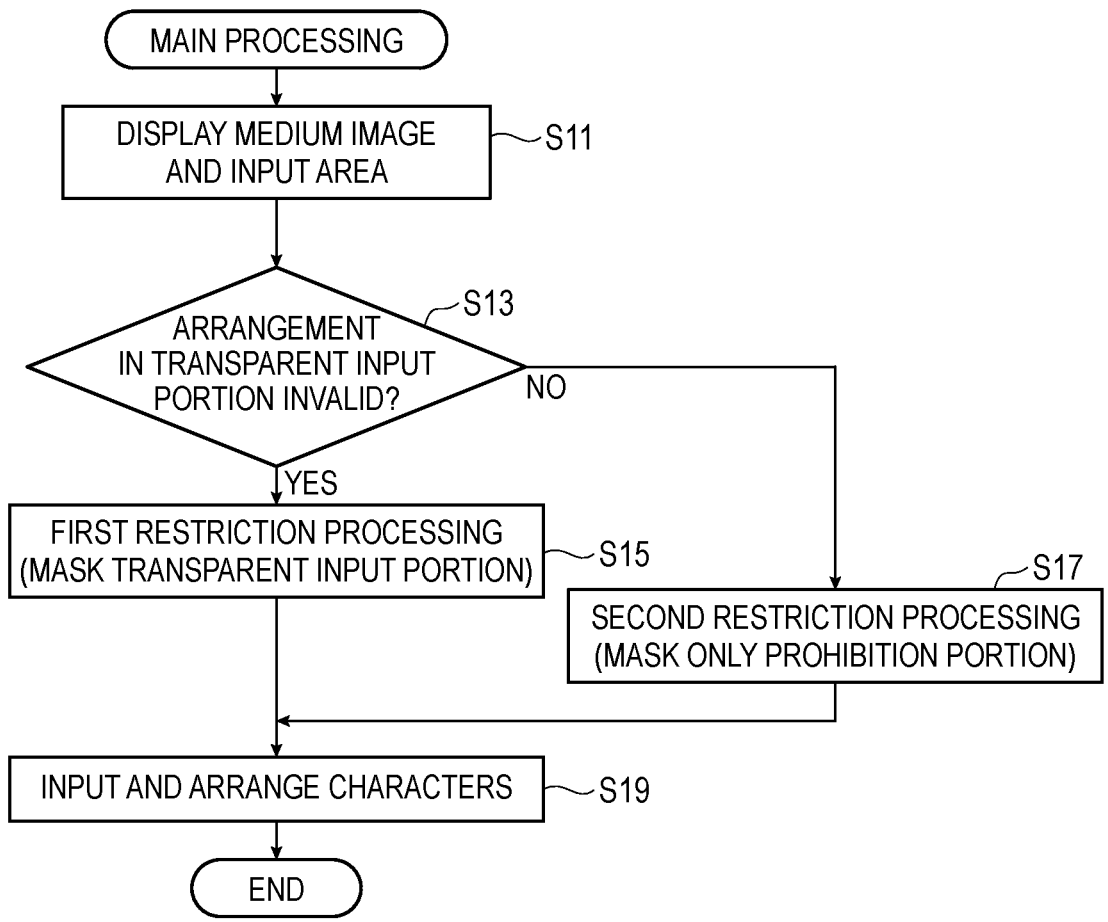
FIG. 12 is a flowchart of main processing.

On the other hand, as shown in FIG. 12, when the CPU 11 determines that the arrangement of the characters in the transparent input portion 91 is enabled (S13: NO), the processing proceeds to S17. The CPU 11 prohibits the arrangement of the characters in the prohibition portion 93 in the transparent input portion 91 of the input area image 83, and executes the second restriction processing in order to allow the arrangement of the characters in the portion of the transparent input portion 91 other than the prohibition portion 93 (S19). In this case, as shown in FIG. 9, the prohibition portion 93 of the transparent input portion 91 is covered with the mask image 76B, and the arrangement of the characters in the prohibition portion 93 is prohibited. On the other hand, the CPU 11 does not cover the portion of the transparent input portion 91 other than the prohibition portion 93 with the mask image 76B, and allows the arrangement of the characters therein. As shown in FIG. 12, the CPU 11 advances the processing to S19.

When the CPU 11 receives the characters input via the input unit 16, the CPU 11 arranges the received characters in the input area image 83 (S19). Then, the CPU 11 ends the main processing.

Effects of Embodiment

The user of the editing device 1 performs setting for disabling the arrangement of the characters in the transparent input portion 91 of the input area image 83, thereby preventing the characters from being printed in the transparent area 61 of the tape 6 (S15). On the other hand, the user performs setting for enabling the arrangement of the characters in the transparent input portion 91 of the input area image 83, thereby permitting the characters to be printed in the transparent area 61 of the tape 6 as necessary (S17). The editing device 1 can appropriately prevent arrangement of a text in the portion of the input area image 83 where the arrangement of the characters is prohibited by executing the mask processing using the mask images 76A, 76B.

Even when it is determined that the arrangement of the characters in the transparent input portion 91 is enabled, the editing device 1 prohibits the arrangement of the characters in the prohibition portion 93 of the transparent input portion 91 (S17). In this case, when the printing tape 60 is wound and attached to the cable 10, it is possible to reduce the possibility that the characters printed in the transparent area 61 and the opaque area 62 overlap each other to lower the visibility of the characters.

The editing device 1 displays the setting screen on the display unit 15 in the setting processing, and receives the setting information input by the user (S33). Based on the received setting information, the editing device 1 determines whether to enable or disable the arrangement of the characters in the transparent input portion 91. Therefore, the user can easily set whether to enable or disable the arrangement of the characters in the transparent input portion 91 in the editing device via the setting screen.

Modification

The present invention is not limited to the above embodiment, and various modifications can be made. The above editing processing may be executed by a CPU (not shown) of the printing device 2. That is, the printing device 2 may generate the print data while editing the layout of the characters, and perform the printing on the tape 6.

The editing device 1 may restrict the arrangement of the characters in the input area image 83 by processing other than the mask processing. For example, in addition to the mask processing, a non-transparent area may be simply referred to as a print area, and an input may be allowed only in the print area. The editing device 1 may restrict the arrangement of the characters by reducing a size of the input area image 83 such that the input area image 83 does not overlap the transparent portion 81 of the medium image 80.

When it is determined that the arrangement of the characters in the transparent input portion 91 is enabled, the editing device may enable the arrangement of the characters in the transparent input portion 91 including the prohibition portion 93. In this case, the mask processing using the mask image may not be performed.

The editing device 1 may acquire the color of the cable 10 around which the printing tape 60 is wound and the color of the ink during printing by the printing device 2. The editing device 1 may determine whether to enable or disable the arrangement of the characters in the transparent input portion 91 based on an acquired relationship between the two colors. For example, when the acquired two colors match or are similar to each other, the editing device 1 may disable the arrangement of the characters in the transparent input portion 91.

The editing device 1 may acquire a diameter of the cable 10 around which the printing tape 60 is wound, and calculate a circumferential length. The editing device 1 may determine a length of the prohibition portion 93 in the width direction D2 according to the calculated length in a circumferential direction.

A portion of the transparent input portion 91 of the input area image 83 in contact with the opaque input portion 92 in the width direction D2 may be the prohibition portion 93.

A portion between the portion of the transparent input portion 91 of the input area image 83 in contact with the opaque input portion 92 in the width direction D2, and the portion apart may be prohibition portion 93.

Others

The CPU 11 of the editing device 1 is an example of a "controller" according to the present invention. The processing of S11 is an example of "display processing" according to the present invention. The processing of S13 is an example of "determination processing" according to the present invention. The processing of S15 and S17 are examples of "restriction processing" according to the present invention. The processing of S33 is an example of "reception processing" according to the present invention. The transparent area 61 is an example of a "light-transmitting area" according to the present invention. The opaque area 62 is an example of a "non-light-transmitting area" according to the present invention. The transparent input portion 91 is an example of a "light-transmitting input portion" according to the present invention. The opaque input portion 92 is an example of a "non-light-transmitting input portion" according to the present invention.

What is claimed is:

1. An editing device comprising:
a controller that is configured to edit a layout of characters to be printed on a printing medium including a light-transmitting area having translucency and a non-light-transmitting area having no translucency,
wherein the controller is configured to execute:
displaying, on a display unit, a medium image corresponding to the printing medium and an input area image overlapped on the medium image and indicating an input area in which the characters are arranged, the input area image including a light-transmitting input portion overlapping a first portion of the medium image and corresponding to the light-transmitting area;
determining whether arrangement of the characters in the light-transmitting input portion is enabled or disabled; and
restricting the arrangement of the characters in the light-transmitting input portion,
wherein, in the restricting, the arrangement of the characters in at least a part of the light-transmitting input portion is allowed when it is determined, in the determining, that the arrangement of the characters in the light-transmitting input portion is enabled, and the arrangement of the characters in the light-transmitting input portion is prohibited when it is determined, in the determining, that the arrangement of the characters in the light-transmitting input portion is disabled.

2. The editing device according to claim 1, wherein the input area image further includes a non-light-transmitting input portion overlapping a second portion of the medium image which is different from the first portion and corresponds to the non-light-transmitting area, wherein the light-transmitting input portion and the non-light-transmitting input portion are arranged in a width direction of the printing medium in the medium image, and wherein the arrangement of the characters in a prohibition portion of the light-transmitting input portion apart from the non-light-transmitting input portion in the width direction is prohibited when it is determined, in the determining, that the arrangement of the characters in the light-transmitting input portion is enabled.

3. The editing device according to claim 1, wherein, in the restricting, the arrangement of the characters is prohibited by masking a portion of the input area.

4. The editing device according to claim 1, wherein the controller further executes receiving setting information indicating whether the arrangement of the characters in the light-transmitting input portion is enabled or disabled via a setting screen displayed on the display unit, and wherein it is determined, in the determining, that whether the arrangement of the characters in the light-transmitting input portion is enabled or disabled based on the setting information received in the receiving.

5. A printing system comprising:

the editing device according to claim 1; and a printing device that is configured to print the characters on the printing medium based on the layout edited by the editing device.

6. An editing method for editing a layout of characters to be printed on a printing medium including a light-transmitting area having translucency and a non-light-transmitting area having no translucency, the editing method comprising:

displaying, on a display unit, a medium image corresponding to the printing medium and an input area image overlapped on the medium image and indicating an input area in which the characters are arranged, the input area image including a light-transmitting input portion overlapping a first portion of the medium image and corresponding to the light-transmitting area;

determining whether arrangement of the characters in the light-transmitting input portion is enabled or disabled; and restricting the arrangement of the characters in the light-transmitting input portion, wherein, in the restricting, the arrangement of the characters in at least a part of the light-transmitting input portion is allowed when it is determined, in the determining, that the arrangement of the characters in the light-transmitting input portion is enabled, and the arrangement of the characters in the light-transmitting input portion of the input area is prohibited when it is determined, in the determining, that the arrangement of the characters in the light-transmitting input portion is disabled.

* * * * *

UNITED STATES PATENT AND TRADEMARK OFFICE
CERTIFICATE OF CORRECTION

PATENT NO. : 11,226,781 B2
APPLICATION NO. : 17/206139
DATED : January 18, 2022
INVENTOR(S) : Hideaki Ueda et al.

It is certified that error appears in the above-identified patent and that said Letters Patent is hereby corrected as shown below:

On the Title Page

Item (57) ABSTRACT, Line 4, is corrected to replace the term "execute" with the term "executes" immediately after the term "controller"

In the Claims

Column 12, Line 1, in Claim 4, is corrected to remove the term "that" immediately before the term "whether"

Signed and Sealed this
Eighteenth Day of April, 2023

Katherine Kelly Vidal
*Director of the United States Patent and Trademark Office*